United States Patent

Wolff et al.

[11] Patent Number: 5,649,672
[45] Date of Patent: Jul. 22, 1997

[54] MOTOR CONTROL OF TAPE TENSION IN A BELT CARTRIDGE

[75] Inventors: Robert E. Wolff, Edina; Jerry L. Alexander, St. Paul Park, both of Minn.

[73] Assignee: Imation Corp., St. Paul, Minn.

[21] Appl. No.: 591,211

[22] Filed: Jan. 17, 1996

Related U.S. Application Data

[63] Continuation of Ser. No. 260,083, Jun. 15, 1994, abandoned.

[51] Int. Cl.$^6$ ........................................ G11B 15/26
[52] U.S. Cl. ................................. 242/334; 242/352.4
[58] Field of Search ................................. 242/334, 334.1, 242/334.2, 334.3, 334.4, 334.6, 352.3, 352.4; 318/6, 7; 360/96.2

[56] References Cited

U.S. PATENT DOCUMENTS

| | | |
|---|---|---|
| 3,692,255 | 9/1972 | von Behren . |
| 3,733,529 | 5/1973 | Ross et al. .................. 318/7 |
| 3,758,048 | 9/1973 | Sugaya et al. . |
| 3,766,328 | 10/1973 | Warren . |
| 3,907,230 | 9/1975 | Merle et al. ............. 242/352.4 |
| 3,942,743 | 3/1976 | Jinsenji ..................... 242/342 |
| 4,139,873 | 2/1979 | Maxey . |
| 4,179,717 | 12/1979 | Maxey . |
| 4,198,013 | 4/1980 | Anglin et al. ............. 242/352.4 |
| 4,199,794 | 4/1980 | Pfost et al. .............. 242/352.4 |
| 4,242,709 | 12/1980 | Stricker ................... 242/352.4 |
| 4,256,996 | 3/1981 | Brooks et al. ................... 318/7 |
| 4,431,146 | 2/1984 | Merle ..................... 242/352.4 |
| 4,455,001 | 6/1984 | Schilke et al. . |
| 4,488,690 | 12/1984 | Merle ..................... 242/352.4 |
| 4,575,022 | 3/1986 | Allwine, Jr. et al. ....... 242/352.4 |
| 4,688,742 | 8/1987 | Hettich ................... 242/352.4 |
| 4,696,439 | 9/1987 | Sukigara et al. . |
| 5,346,155 | 9/1994 | Alexander et al. ........... 242/334 |
| 5,374,004 | 12/1994 | von Behren ............. 242/352.4 |

FOREIGN PATENT DOCUMENTS

| | | |
|---|---|---|
| 0022651 | 1/1981 | European Pat. Off. . |
| 573816 | 9/1977 | U.S.S.R. ................. 242/352.4 |

OTHER PUBLICATIONS

Ohm, "Reel-to-Reel Drive Design for a Cassette Recorder," *Computer Design*, Aug. 1973, p. 67.

von Behren, "Factors Affecting Tape Tension and Drive Force in Data Cartridges," MINCOM Lab, Document No. 1034, Oct. 24, 1975.

Davis, "Update on Magnetic Tape Memories," *Computer Design*, Aug. 1974, vol. 13, No. 8, p. 127.

*Primary Examiner*—John P. Darling
*Attorney, Agent, or Firm*—Charles L. Dennis, II

[57] ABSTRACT

A drive and tape cartridge provide motor control for the tape tension in a belt-driven tape cartridge. Two different rollers drive the belt, and are controlled by two separate motors. This allows reduction in the friction required in the system and allows optimal sizing of the motors.

17 Claims, 5 Drawing Sheets

MOTOR CONTROL OF TAPE TENSION IN A BELT CARTRIDGE

This is a continuation of application Ser. No. 08/260,083 filed Jun. 15, 1994, now abandoned.

BACKGROUND OF THE INVENTION

1. Field of the Invention

The present invention relates to belt-driven computer tape cartridges and, in particular, to ways of maintaining appropriate tension in the tape in the cartridge.

2. Description of the Related Art

A highly successful elastic belt-driven data cartridge originally was taught in U.S. Pat. No. 3,692,255 (von Behren). In that reference, a tape cartridge has tape wrapped convolutely in opposite directions around hubs and guide pins to guide the tape past the tape drive read/write head. An elastic belt wraps partway around the tape packs on the hubs, as well as around corner rollers and a drive roller. The belt is moved by the drive through frictional rotation of a drive puck by a motor. Provided adequate tension is maintained in the belt, movement of the belt simultaneously will move the tape. Friction at the corner rollers will differentially stretch the belt, which results in tension in the tape so that it can interface properly with the read/write head.

In the past, tension has been maintained in the tape primarily through carefully controlling the amount of friction in the rollers. More recently, use of magnetic hysteresis has been suggested. PCT Published Application No. WO 93/22767 (Alexander et al.).

The problem with either of these techniques is that they depend upon a constant flow of power to overcome either the friction or the magnetic hysteresis and maintain adequate tape tension. The drive must provide that power. No matter how efficient the drive electronics themselves may become, the drive therefore always will consume power to overcome the frictional or magnetic hysteresis losses, producing heat inside the tape cartridge.

Non-belt-driven cartridges theoretically can avoid these frictional losses. For example, U.S. Pat. No. 3,733,529 (Ross et al.), U.S. Pat. No. 4,256,996 (Brooks et al.) and U.S. Pat. No. 4,696,439 (Sukigara et al.) all propose non-belt cartridges driven through their hubs. In each of these designs, a motor/generator is connected to each hub. When the tape is to be driven in one direction, one of these two motor/generators acts as a motor driving the tape, while the other acts as a generator providing drag on the tape. When the tape is moved in the opposite direction, the roles are reversed. In either situation, proper tension in the tape would be maintained by carefully controlling the relative difference in force being applied between the motor and generator.

While such designs theoretically overcome the friction problem, they suffer from very serious drawbacks of their own. First, each of the motors must be relatively large, since it could be the main drive motor depending on the direction in which the tape is moving. Second, the complexity of the control required can be quite high, since the speed of rotation at the hub varies dramatically depending upon the size of the tape pack wound around the hub at any given instant. Such systems therefore are theoretically possible, but expensive.

SUMMARY OF THE INVENTION

The present invention provides a belt-driven cartridge and a drive therefore in which tape tension is maintained at least in part by a tension control motor separate from the normal drive motor. The drive motor can be positioned to move the belt, and therefore the tape, in much the same fashion as in the past. The tension control motor then acts as either a motor or a generator to drive or retard one of the other belt rollers in the cartridge to maintain appropriate tape tension.

Such a design overcomes all of the problems mentioned above. Frictional losses can be minimized and are no longer a requirement. Whenever significant drag is required to maintain tension in the belt and tape, the tension control motor is operating as a generator, producing power which may be fed back to the power supply instead of being totally lost to friction or hysteresis. In addition, while the drive motor will have to be approximately the same size as current drive motors, the tension control motor can be quite small. The only force it needs to exert is the very small force required to maintain the tape tension. Only the drive motor, not the tension control motor, needs to be sized to move the tape in one direction or the other.

The range of speeds required for driving the belt in this design is much smaller than the range of speeds required for directly driving the hubs, since as the circumference of one tape pack gets smaller, the other gets larger. The range of speeds for the belt therefore is relatively small. This allows optimization of the motors for that small range of speeds, rather than for this very broad range of speeds required for hub-driven motors. Control then can be maintained by a feedback loop between a tape tension sensor and the tension control motor controls, or through various other relatively simple mechanisms depending on the amount of tape tension control desired.

The net result is a tape and drive which can have lower power consumption compared to the current systems. In addition, the tape tension can be maintained precisely through the tension control feedback system, rather than approximately maintained through initial manufacturing control of the friction in the rollers (which are subject to degradation with wear).

A further aspect of the invention provides for a rearrangement of the rollers and hub positions in the drive to maximize the total volume of tape which can fit within the cartridge.

A final aspect of the invention incorporates a motor into the cartridge itself, so that one of the rollers is itself the tension control motor. Suitable leads then are provided to the exterior of the drive to connect to the control system. This further minimizes the complexity of the drive.

DETAILED DESCRIPTION OF THE PREFERRED EMBODIMENTS

Figure 1:
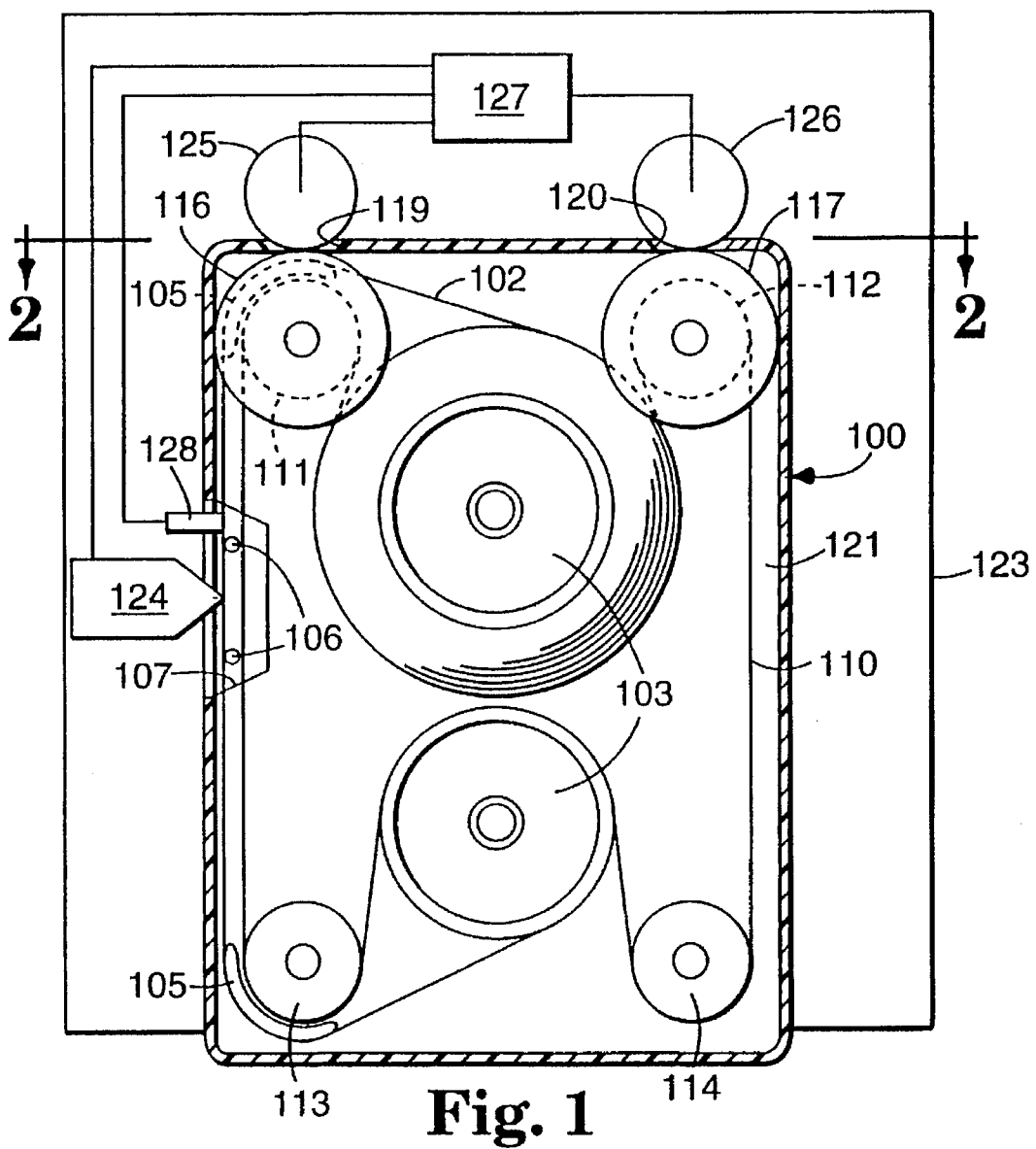
FIG. 1 is a plan view of a first embodiment of a drive and cartridge according to the present invention.
Figure 2:
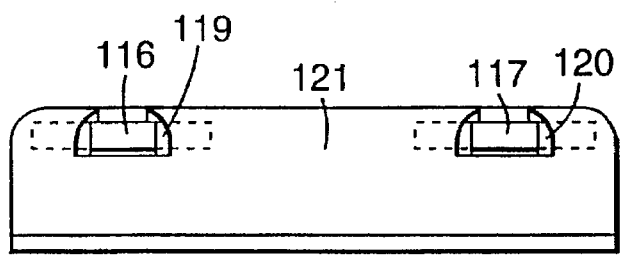
FIG. 2 is a side view of the cartridge of FIG. 1.

FIG. 1 illustrates a first embodiment of a cartridge and drive according to the present invention. The cartridge 100 has tape 102 wrapped in opposite directions around hubs 103. The tape 102 is guided by corner guides 105 and guide pins 106 past a read/write opening 107 in the cartridge 100. A belt 110 wraps around the packs formed by the tape 102 around the hubs 103. Drive surfaces 116, 117 are part of or are mounted to the drive roller 111 and tension control roller 112, so that movement of the drive surfaces 116, 117 will drive or retard rollers 111, 112, respectively. As best seen in FIG. 2, access holes 119, 120 are formed in the wall 121 of the cartridge 100 adjacent to the drive surfaces 116, 117 to allow access thereto from the outside of the cartridge 100.

A drive 123 according to the present invention includes a read/write head 124, a drive motor 125 with a suitable drive gear or puck, a tension control motor 126 with a similar drive gear or puck, and a control system 127 therefore. Preferably, the drive also includes a tape tension sensor 12.8. The drive 123 includes all of the many other items necessary for it to function as a drive, for example, a loading mechanism, circuitry to interpret magnetic signals detected by the head from the tape and to write to the tape, circuitry to position the head relative to the tape and the like. Such drive elements are well known to one of ordinary skill in the art and therefore will not be described further here.

If tape cartridge 100 according to the present invention is positioned in drive 123 according to the present invention as shown in the FIG. 1, the head 124 is positioned adjacent to the read/write opening 107, where it has access to the tape 102. Drive puck of the drive motor 125 is positioned against the drive roller drive surface 116 in driving contact with the same, while drive puck of the tension control motor 126 similarly is positioned in driving contact with the tension control drive surface 117. To advance the tape in either direction, the drive motor 125 drives the drive surface 116, which in turn drives the drive roller 111. Frictional engagement between the drive roller 111 and the belt 110 causes the belt to move in the driven direction.

As will be apparent to one of skill in the art, the two rollers 112, 114 would function in much the same way as the original rollers in von Behren's original U.S. Pat. No. 3,692,255 to produce differential tape tension in suitable locations, provided there were suitable amounts of friction or magnetic hysteresis designed into the hubs of the rollers 112, 114. However, as mentioned above, this necessary friction is the source of the substantial power consumption of this type of tape cartridge.

In marked contrast, according to the present invention the corner rollers 111, 112, 113, 114 are mounted to be rotatable with minimal friction (i.e., they are mounted in as nearly frictionless a manner as economically practical). This is because tension is supplied and controlled according to the present invention using the tension control motor 126, instead of friction, so friction represents nothing but a power drain to be minimized.

According to the present invention, the control system 127 operates the tension control motor 126 to drive the tension control drive surface 117 and therefore the tension control roller 112, in the appropriate direction to develop suitable tension in the belt 110. Typically, this will mean operating the tension control motor as a generator. This will work in either direction, since the belt 110 will pull the roller 112 via the top tape pack when moving in one direction, and via corner roller 114 when moving in the opposite direction. It also may be possible to operate the tension control motor 126 as a generator in one direction to increase tape tension and as a motor in the other to reduce tape tension, though controlling the system would be more complicated. In either case, the amount of drag applied to the belt by the tension control motor 126 will depend upon the amount of current or voltage applied across it by the control system 127.

Preferably, the control system actually controls both the drive motor 125 and the tension control motor 126 to maintain suitable tension in the tape 102 which is detected continuously at the tape tension sensor 128. However, other control systems can be used as discussed further below.

As will be apparent, friction in the rollers preferably is as small as possible, reducing the power loss. When the tension control motor 126 must provide drag, it is operating as a generator, so that the power lost there is recovered for use in the system and can be fed back to the drive motor 125.

Exactly which rollers are used for the drive and tension control motors, or whether four total rollers are used, is not critical to the present invention. What is critical is that the drive motor and the tension motor are on opposite "sides" of the tape packs. That is, whatever route the belt takes to get from one motor drive roller to the other, it must pass over one of the tape packs between the two motors.

As will be apparent, the drive motor and tension motor need not be the same size. In particular, the drive motor should be sized appropriately to provide the necessary range of speeds for reading or writing and fast forward and fast rewind. The tension control motor, on the other hand, can be much smaller, since it need only provide the small amount of force needed to maintain suitable tension in the belt and tape.

Figure 3:
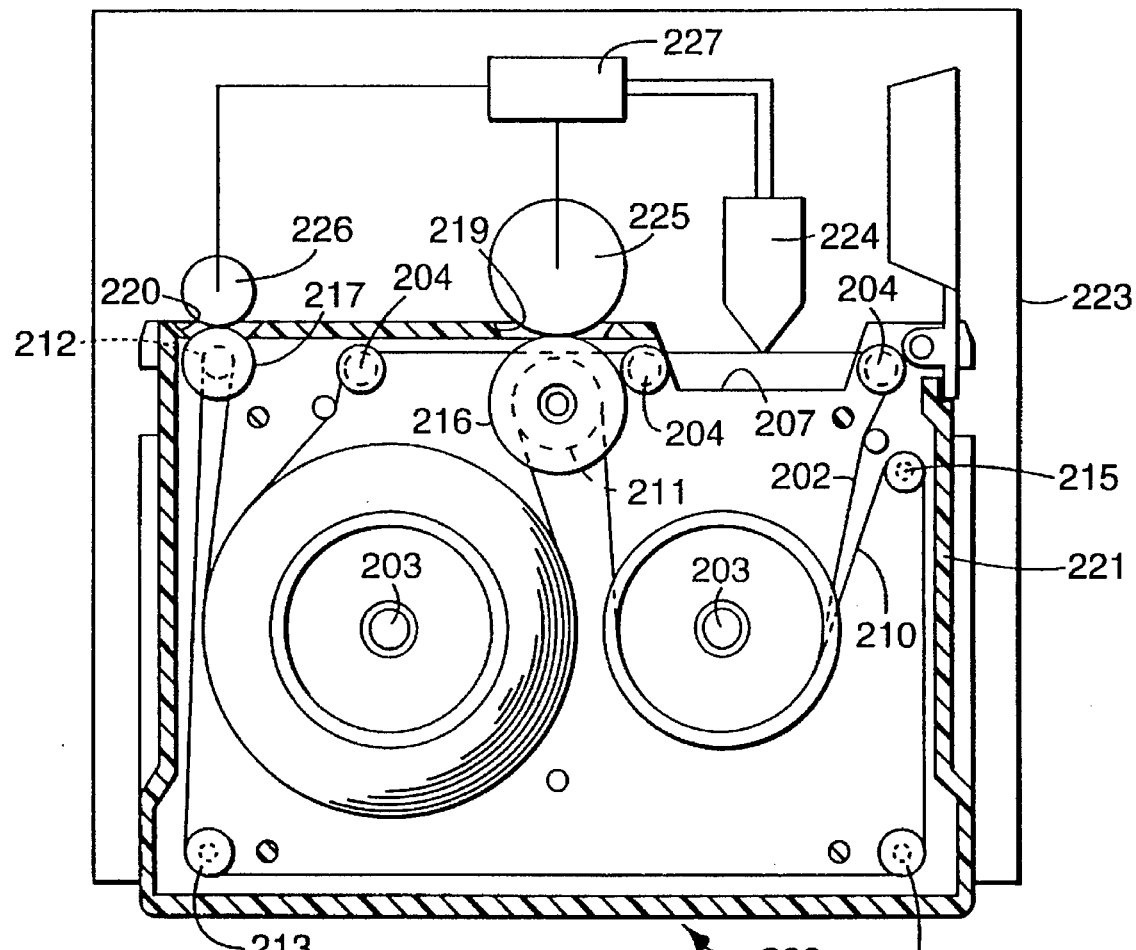
FIG. 3 is a plan view of a second embodiment of a drive and cartridge according to the present invention.

FIG. 3 illustrates an alternative embodiment of a cartridge and drive according to the present invention. Elements which serve substantially the same function as elements in FIG. 1 have been numbered correspondingly starting with 200 instead of 100, and will not be described in further detail. Notable differences are that the tape is now guided by tape guides 204, instead of corner guides 105 and guide pins 106. The drive surface 216 is on a drive roller 211 which is positioned in a more traditional location for the drive roller in a beltdriven tape cartridge, that is, towards the center of the front of the cartridge. The belt then wraps around corner rollers 212, 213, 214, 215. The tension control drive surface 217 now is mounted to corner roller 212. Finally, the tension control sensor is incorporated into the support structure for the read/write head 224, as represented by the dual lead lines to the control system 227.

As will be apparent, this embodiment has the advantage over the first embodiment that all drive and read/write locations are on one side of the cartridge, possibly simplifying drive design. It also will be noted that while the drive roller 211 and tension control roller 212 are physically on the same side of the cartridge, they still are on opposite "sides" of the tape pack, since the belt 210 wraps around the left-hand tape pack while passing from roller 211 to roller 212, or vice-versa.

Figure 4:
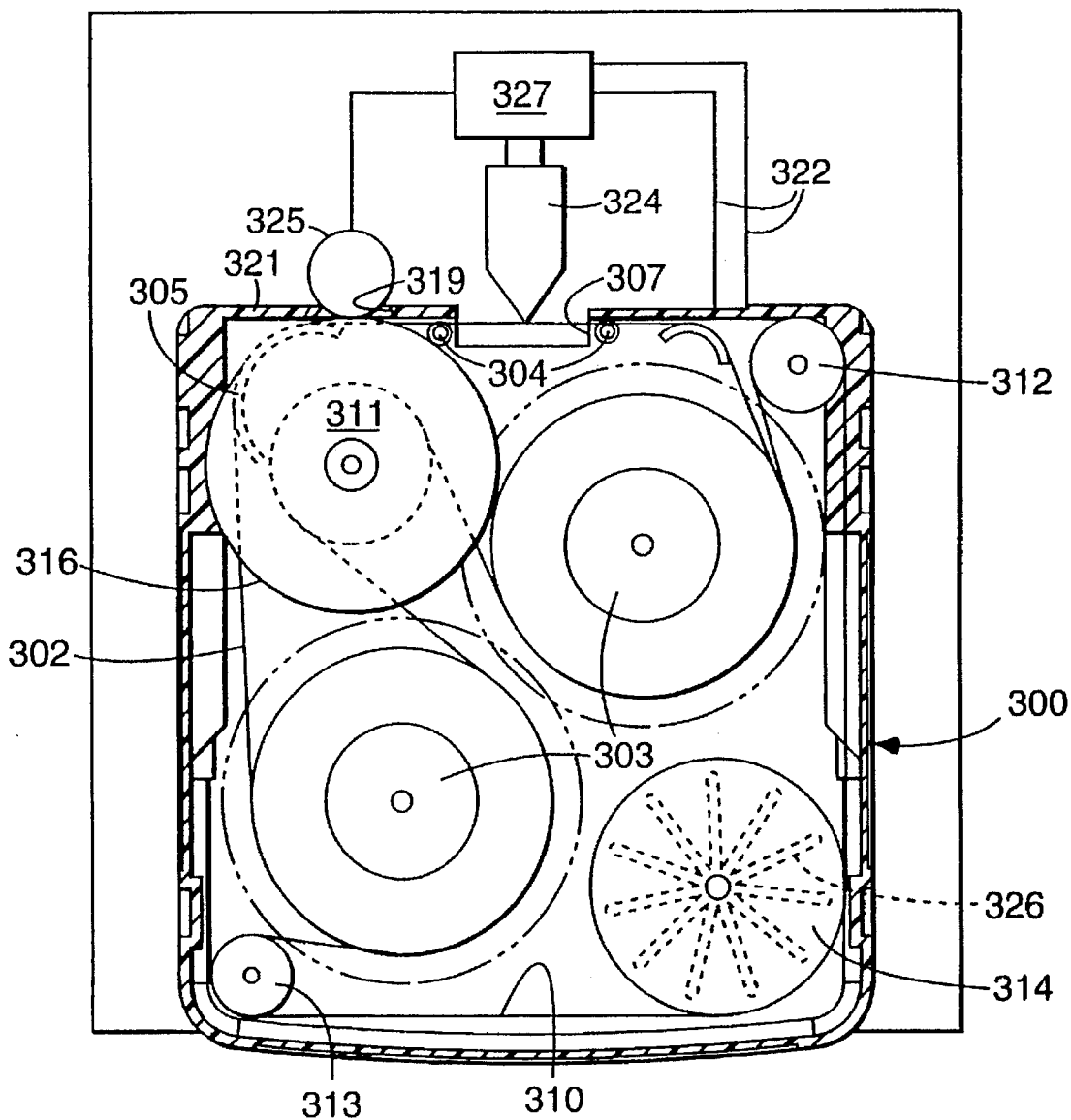
FIG. 4 is a plan view of a third embodiment of a drive and cartridge according to the present invention.

FIG. 4 illustrates yet another embodiment of the cartridge according to the present invention. Again, equivalent features to those described before have been designated with similar reference numerals, but this time beginning with 300, and will be not described further.

Notable differences in this embodiment are that the hubs 303 have been offset from the center line of the cartridge 300 so that their tape packs can extend well into the corners of the cartridge 300. The cartridge 300 itself is closer to being square. The combination of these changes allows for significantly more tape to be held in the cartridge 300. The cartridge 300 also places the drive roller 311 and the drive surface 316 in the upper corner of the cartridge as seen in the drawing.

The most noticeable difference in this embodiment is placement of the tension control motor 326. In this embodiment, the corner roller 314 is relatively large and is magnetically sensitive. The tension control motor 326 is positioned above or below the location of this roller 314 and inductively couples to the roller 314 to control the tension in the drive. This tension control motor 326 can be part of the drive as in the other examples. Alternatively, since the power requirements for the tension control motor are quite low, a motor could actually be embedded in or stamped onto the surface of the base plate or top plate of the cartridge itself, and then connected to the control system 327 through suitable lead lines 322. This has the advantage of insuring very good inductive coupling, or even direct mechanical coupling, but the disadvantage of requiring production of the motor in every cartridge, rather than just once per drive.

Figure 5:
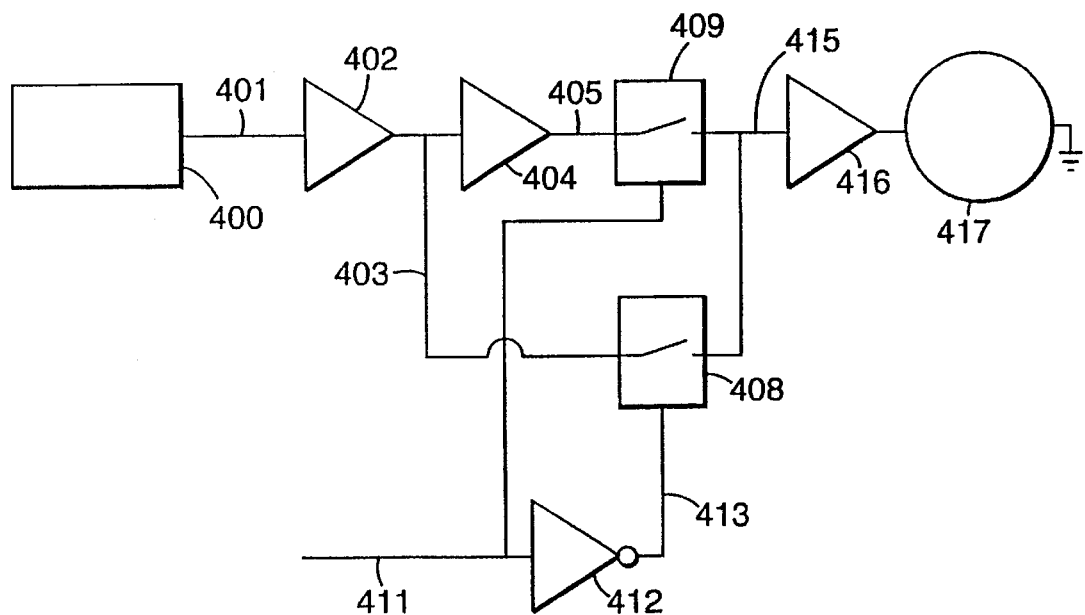
FIGS. 5 through 9 are various alternative embodiments of a control system according to the present invention.

FIG. 5 is a schematic representation of a possible control system for use as the control system 127, 227, 327 in the embodiments shown above. The embodiment shown in FIG. 5 is a closed loop system. In this system, a transducer 400 (which can be a separate transducer or a transducer integral with the head or head support structure) generates a signal representative of the tape tension at the head. This signal is provided via line 401 to an amplifier 402, which provides an amplified version of the signal to line 403. Line 403 provides this amplified signal to an inverting amp 404 which provides the inverted signal to line 405. Lines 403, 405 also connect to gates 408, 409, respectively. The control system also includes a signal on line 411 representative of the direction of tape travel. The signal on line 411 controls the operation of gate 409, and simultaneously is provided to an inverter 412. The output of the inverter 412 is provided to line 413, which in turn controls operation of gate 408. As will be apparent, depending on the signal on line 411, the system will close either gate 408 or gate 409, and provide the resulting signal to line 415. The signal in line 415 in turn is provided to driver 416, the output of which controls the operation of the motor/generator 417. The motor 417 also is connected to ground as shown.

Figure 6:
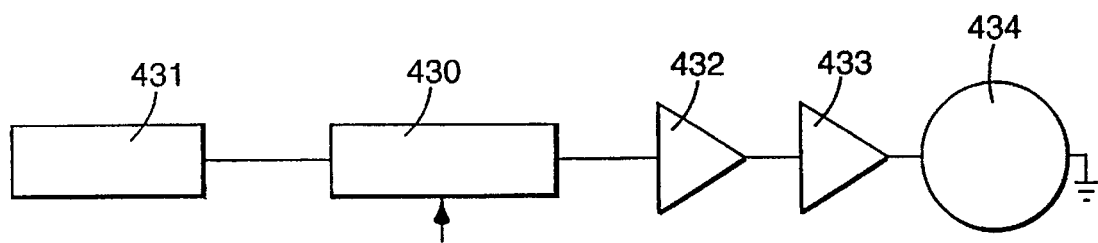

FIG. 6 illustrates an alternative open loop control system. In this system, a processor 430 keeps track of the position along the tape path of the tape and the direction of tape movement. A lookup table stored in memory 431 contains information about the amount of drag or additional torque output needed by the motor to maintain appropriate tension in the belt based on the position of the tape. The processor 430 repeatedly determines the position and direction of movement of the tape, checks the lookup table in the memory 431 Based on the position and direction of movement, and provides a suitable signal to the amplifier 432 to provide to the motor driver 433 and motor 434 to control the action of the motor/generator 434.

While such an open loop system can be used, it has the disadvantage of requiring advance knowledge of the characteristics of the precise tape being inserted into the drive, limiting flexibility of the drive, and requiring either some method of storing the tape position in a non-volatile memory or re-winding the tape in the event of a power failure to the system.

Figure 7:
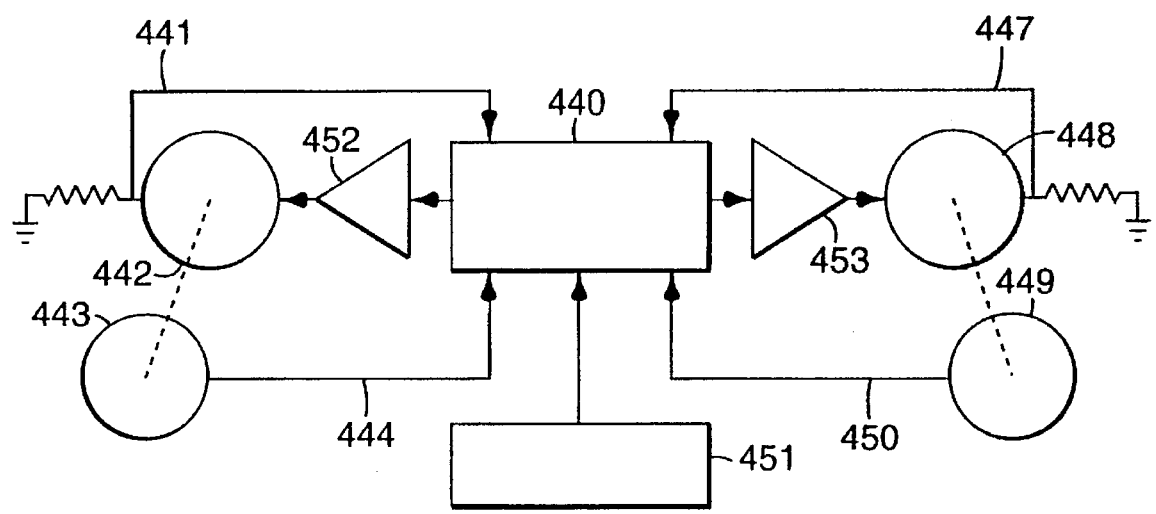

Yet another alternative embodiment is shown in FIG. 7. In this embodiment, rather than directly measuring the tape tension or using an open loop method, the control system takes advantage of the fact that the tape tension will be dependent upon the difference in the amount of torque being provided by the motors. Rather than measuring the tape tension itself, the difference in motor currents is measured. Referring to FIG. 7, a processor 440 periodically checks the signal on line 441, which is indicative of the motor current drawn by the motor 442. A tachometer 443 also provides an indication of the direction and speed of the motor 442 to the processor 440 via a line 444. Similarly, line 447 provides a signal to the processor 440 representative of the current drawn by the motor 448, and tachometer 449 indicates via line 450 the direction and speed of the motor 448. The processor 440 periodically checks the respective motor currents, directions and speed of the motors 442, 448 and compares them to a lookup table stored in memory 451 containing the characteristics of the motors 442, 448. This lookup table indicates the amount of torque being generated by each motor based upon the motor current, direction and speed. The processor 440 determines the forces generated by the motors 442, 448, determines the net difference in forces compared to a predetermined desired tape tension, and sends suitable control signals to the drivers 452, 453 to adjust the motor speeds appropriately.

Unlike the open loop system, this system requires no advance knowledge of the cartridge, just of the motors. Since for any given drive the motors do not change, this is rot a problem. In addition, this system easily allows for changes in the tape tension level for different operating conditions, for example, between read/write activities and fast forward, simply by changing the predetermined tape tension used in the comparison.

Figure 8:
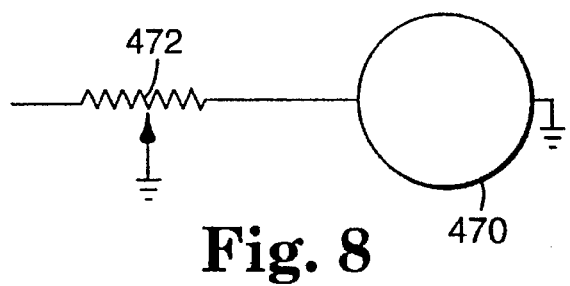

FIG. 8 is yet another embodiment of a control system. With this system, the tension control motor 470 is connected between ground on one side and through a resistor 472 to ground on the other side. The motor 470 always is run as a generator. The amount of drag produced on the belt, and hence the amount of tension induced in the belt, therefore is determined by the size of the resistor 472. The resistor 472 preferably is a variable resistor to allow adjustment of the resistance level during manufacture and to set the tape tension for different speeds. This structure has the advantage of being extremely simple and inexpensive, but the disadvantages that the drag energy is dissipated by the resistor 472 rather than fed back into the system and the drag force is constant only for a particular speed.

Figure 9:
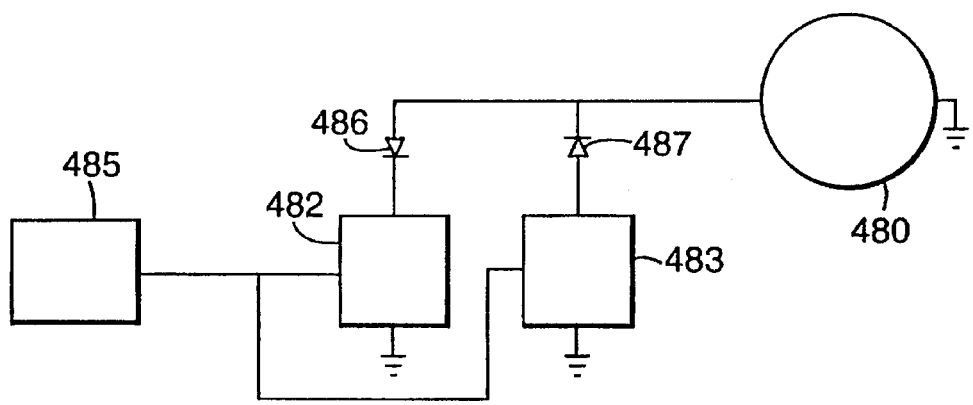

FIG. 9 is a slightly more elaborate version using current control. The generator 480 again is connected directly to ground on one side and indirectly to ground on the other side via variable current elements 482, 483. In this system the current through the variable current elements 482, 483 is controlled based on a feed back signal, e.g., from a transducer 485 measuring the tape tension. Diodes 486, 487 are provided if current elements 482, 483 only allow current flow in a single direction.

It will be understood that these exemplary embodiments in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and scope of the appended claims are covered.

We claim:

1. A tape cartridge for use in a tape drive, the tape cartridge comprising:

a. a housing having a media access opening, a drive access opening and a tension control access opening formed therein on one side of the housing;

b. first and second hubs rotatably mounted inside the housing;

c. tape convolutely wound in opposite directions around the hubs to form two tape packs;

d. at least one tape positioning element for guiding the tape past the media access opening;

e. a drive roller rotatably mounted inside the housing and accessible from the outside of the housing through the drive access opening;

f. a tension control roller rotatably mounted inside the housing;

g. at least one additional roller;

h. an elastic belt stretchably entrained around the tape packs, the drive roller, the tension control roller and the at least one additional roller so that movement of the drive roller will cause the belt to move, thereby moving the tape; and i. tension control means for allowing the tape drive to control the rotation of the tension control roller from the outside of the housing while the cartridge is in operation in the drive, thereby to control the tension in the tape, the tension control means comprising positioning the tension control roller to be accessible for engagement from the outside of the housing through the tension control access opening.

2. The tape cartridge of claim 1, wherein the at least one tape positioning element comprises at least one element selected from the group consisting of tape guides and tape pins.

3. The tape cartridge of claim 1, wherein said at least one additional roller comprises two additional rollers.

4. A tape cartridge comprising:

a. a housing having a media access opening, a drive access opening, and a tension control access opening formed therein on one side of the housing;

b. first and second hubs rotatably mounted inside the housing;

c. tape convolutely wound in opposite directions around the hubs to form two tape packs;

d. at least one tape positioning element for guiding the tape past the media access opening;

e. a drive roller mounted to be rotatable with minimal friction inside the housing and accessible from the outside of the housing through the drive access opening;

f. a tension control roller mounted to be rotatable with minimal friction inside the housing proximate a corner thereof and accessible from the outside of the housing through the tension control access opening;

g. two additional corner rollers mounted to be rotatable with minimal friction inside the housing proximate corners thereof different from each other and from the tension control roller;

h. an elastic belt stretchably entrained around the tape packs, the drive roller, the tension control roller and the two additional corner rollers so that movement of the drive roller will cause the belt to move, thereby moving the tape.

5. A tape drive for a cartridge containing tape and having a drive roller rotatably mounted inside the cartridge and accessible from the outside of the cartridge, a tension control roller rotatably mounted inside the housing, an elastic belt for moving the tape and which is wrapped around the drive roller and the tension control roller, the tension in the tape being controlled by the differential in the forces applied to the belt by the drive roller and the tension control roller, the cartridge tension control means rotating the tension control roller under control from the outside of the housing, and the tension control roller including magnetically sensitive material, the drive comprising:

a. a drive motor for providing motive power to the drive roller of the cartridge; and b. drive control means for controlling the cartridge control means to control the rotation of the tension control roller through inductive coupling to the tension control roller.

6. The tape drive of claim 5, wherein the tension control roller is accessible from the outside of the cartridge, and the drive control means comprises a tension control motor for providing motive power to or receiving motive power from the tension control roller.

7. The tape drive of claim 6, wherein the drive control means further comprises:

a. a memory including data on performance characteristics of the drive motor and the tension control motor;

b. drive motor current signal means for generating a drive motor current signal representative of the drive motor current;

c. drive motor tachometer signal means for generating a drive motor direction and speed signal representative of the direction and speed of the drive motor;

d. tension control motor current signal means for generating a tension control motor current signal representative of the tension control motor current;

e. tension control motor tachometer signal means for generating a tension control motor direction and speed signal representative of the direction and speed of the tension control motor;

f. a processor for periodically checking the drive motor current signal, drive motor direction and speed signal, tension control motor current signal and tension control motor direction and speed signal, determining from these signals and the data stored in the memory the amount of force being applied to the belt by the drive motor and the tension control motor, and generating a drive motor control signal and a tension control motor signal for controlling the drive motor and tension control motor so that the net force on the belt will produce a predetermined desired tension in the tape;

g. a drive motor control driver for receiving and controlling the drive motor according to the drive motor control signal; and h. a tension control motor driver for receiving and controlling the tension control motor according to the tension motor control signal.

8. The tape drive of claim 5, wherein the drive control means comprises an inductor to couple inductively to the tension control roller to provide motive power to or receive motive power from the tension control roller.

9. The tape drive of claim 5, wherein the cartridge also includes an inductor to couple inductively to the tension control roller to provide motive power to or receive motive power from the tension control roller, and lead lines connecting the inductor to the outside of the cartridge, and the drive control means further comprises connections to the lead lines to control the power flow in the inductor.

10. The tape drive of claim 5, wherein the tape is accessible from the outside of the cartridge and the drive control means further comprises a tape tension sensor to measure the tension of the tape.

11. The tape drive of claim 10, further comprising a read/write head for making contact with the tape to read from/write to the tape, and wherein the tape tension sensor is part of a support structure for the read/write head.

12. The tape drive of claim 10, wherein the tape tension sensor generates a tape tension signal indicative of the tension of the tape, and the drive control means further comprises direction means for generating a direction signal indicative of the direction of travel of the tape in the cartridge and a closed loop feedback system for receiving the tape tension signal and the direction signal, and driving the cartridge control means based on such signals to maintain the tape tension signal near a predetermined value.

13. The tape drive of claim 10, wherein the tape tension sensor generates a tape tension signal indicative of the tension of the tape, and the control means further comprises:

a. a first diode and a second diode connected in parallel to each other but in opposite directions from each other;

b. first and second proportional circuit means connected in series between the first and second diodes, respectively, and ground, each proportional circuit means receiving the tape tension signal and allowing a constant current flow therethrough; and c. a tension control motor the armature of which is driven by the tension control roller, one electrical side of which is connected between the two diodes and the other electrical side of which is connected to ground.

14. The tape drive of claim 5, wherein the drive control means further comprises:

a. direction means for generating a direction signal indicative of a direction of travel of the tape;

b. memory including information about the amount and direction of current needed by the cartridges tension control means to produce a desired level of tape tension;

c. a processor for periodically determining the position of the tape and storing this same in memory, detecting the direction signal, looking up in the memory the amount and direction of force needed by the cartridge control means to produce the desired tape tension at the current tape position and direction, and generating a control signal based on the stored information to control the cartridge tension control means to maintain a predetermined tape tension.

15. The tape drive of claim 5, wherein the drive control means further comprises a tension control motor the armature of which is driven by the tension control roller, one electrical side of which is connected to ground and the other electrical side of which is connected to a resistor, which is in turn connected to ground.

16. A tape cartridge for use in a tape drive, the tape cartridge comprising:

a. a housing having a media access opening and a drive access opening formed therein;

b. first and second hubs rotatably mounted inside the housing;

c. tape convolutely wound in opposite directions around the hubs to form two tape packs;

d. at least one tape positioning element for guiding the tape past the media access opening;

e. a drive roller rotatably mounted inside the housing and accessible from the outside of the housing through the drive access opening;

f. a tension control roller rotatably mounted inside the housing;

g. at least one additional roller;

h. an elastic belt stretchably entrained around the tape packs, the drive roller, the tension control roller and the at least one additional roller so that movement of the drive roller will cause the belt to move, thereby moving the tape; and i. tension control means for allowing the tape drive to control the rotation of the tension control roller from the outside of the housing while the cartridge is in operation in the drive, thereby to control the tension in the tape, the tension control means comprising including a magnetically sensitive material in the tension control roller so that the roller can be coupled inductively to an inductor outside of the cartridge adjacent to the roller.

17. A tape cartridge for use in a tape drive, the tape cartridge comprising:

a. a housing having a media access opening and a drive access opening formed therein;

b. first and second hubs rotatably mounted inside the housing;

c. tape convolutely wound in opposite directions around the hubs to form two tape packs;

d. at least one tape positioning element for guiding the tape past the media access opening;

e. a drive roller rotatably mounted inside the housing and accessible from the outside of the housing through the drive access opening;

f. a tension control roller rotatably mounted inside the housing;

g. at least one additional roller;

h. an elastic belt stretchably entrained around the tape packs, the drive roller, the tension control roller and the at least one additional roller so that movement of the drive roller will cause the belt to move, thereby moving the tape; and i. tension control means for allowing the tape drive to control the rotation of the tension control roller from the outside of the housing while the cartridge is in operation in the drive, thereby to control the tension in the tape, the tension control means comprising magnetically sensitive material in the tension control roller, an inductor in the housing adjacent to the tension control roller, and lead lines connecting the inductor to the outside of the housing to allow control of the current through the inductor.

* * * * *

UNITED STATES PATENT AND TRADEMARK OFFICE
CERTIFICATE OF CORRECTION

PATENT NO.: 5,649,672
DATED: July 22, 1997
INVENTOR(S): Wolff et al.

It is certified that error appears in the above-identified patent and that said Letters Patent is hereby corrected as shown below:

Col. 3, line 14, "12,8" should be --128--.

Col. 4, line 36, "beltdriven" should be --belt-driven--.

Col. 5, line 10, "ccnnected" should be -- connected--.

Col. 6, line 20 "rot" should be --not--.

Signed and Sealed this

Twelfth Day of May, 1998

Attest:

BRUCE LEHMAN

Attesting Officer

Commissioner of Patents and Trademarks